United States Patent
Clevenger (10) Patent No.: US 9,582,604 B2
(45) Date of Patent: Feb. 28, 2017

(54) CACHING MECHANISM TO IMPROVE USER INTERFACE RESPONSIVENESS

(71) Applicant: THOMSON LICENSING, Issy de Moulineaux (FR)

(72) Inventor: Brian Duane Clevenger, Muncie, IN (US)

(73) Assignee: THOMSON LICENSING, Issy de Moulineaux (FR)

( * ) Notice: Subject to any disclaimer, the term of this patent is extended or adjusted under 35 U.S.C. 154(b) by 250 days.

(21) Appl. No.: 14/197,246

(22) Filed: Mar. 5, 2014

(65) Prior Publication Data
US 2014/0297954 A1     Oct. 2, 2014

Related U.S. Application Data

(60) Provisional application No. 61/805,596, filed on Mar. 27, 2013.

(51) Int. Cl.
*G06F 12/00* (2006.01)
*G06F 13/00* (2006.01)
*G06F 17/30* (2006.01)
*G06F 12/08* (2016.01)

(52) U.S. Cl.
CPC .... *G06F 17/30902* (2013.01); *G06F 12/0806* (2013.01)

(58) Field of Classification Search
CPC ............. G06F 12/0806; G06F 12/0813; G06F 12/0831; G06F 12/084; G06F 12/0844; G06F 12/0842; G06F 12/123
See application file for complete search history.

(56) References Cited

U.S. PATENT DOCUMENTS

| | | | |
|---|---|---|---|
| 6,941,432 B2 | 9/2005 | Ronstrom | |
| 8,234,518 B2 | 7/2012 | Hansen | |
| 8,539,154 B2* | 9/2013 | Jaquette | H04N 21/231 707/661 |
| 2005/0044319 A1* | 2/2005 | Olukotun | G06F 9/30032 711/118 |
| 2008/0228835 A1* | 9/2008 | Lashley | G06F 11/2041 |
| 2009/0300027 A1 | 12/2009 | Matsunaga et al. | |
| 2009/0300397 A1* | 12/2009 | Nguyen | G06F 1/3225 713/324 |
| 2012/0113796 A1 | 5/2012 | Qiu et al. | |

(Continued)

FOREIGN PATENT DOCUMENTS

| | | |
|---|---|---|
| EP | 2135165 | 1/2011 |
| WO | WO2008/113647 | 9/2008 |

*Primary Examiner* — Sean D Rossiter
(74) *Attorney, Agent, or Firm* — Brian J. Dorini; Jerome G. Schaefer (57) ABSTRACT

A method to preferentially wait for fresh data from a primary source to become available in a system where there is also an older set of data from a secondary source. The method includes receiving a data request that is to be displayed and determining if the data from the primary source is available. If the primary source is not available, a dynamic threshold value is tested to detect if a wait time for access to the primary source is exceeded. If the wait time for access to the primary source is exceeded, then older data from the secondary source instead of the primary source is acquired. The dynamic threshold includes an elapsed time since receipt of the request as measured from a receipt time of a prior request.

20 Claims, 8 Drawing Sheets

(56) References Cited

U.S. PATENT DOCUMENTS

2012/0192006 A1* 7/2012 Qi ...................... G06F 11/0757
714/6.22
2014/0047190 A1* 2/2014 Dawkins ............. G06F 12/0813
711/136

* cited by examiner

CACHING MECHANISM TO IMPROVE USER INTERFACE RESPONSIVENESS

CROSS REFERENCE TO RELATED APPLICATIONS

This application claims priority to U.S. Provisional Application No. 61/805,596 entitled "Caching Mechanism to Improve User Interface Responsiveness", filed on 27 Mar. 2013, which is hereby incorporated by reference in its entirety for all purposes.

FIELD

The present invention relates to user interfaces, and in particular, is related to a scheme for improving the responsiveness of a user interface.

BACKGROUND

User interfaces, including graphical user interfaces (GUI), can fail to be responsive to user inputs when the underlying data is not available for display to the user when such data is requested. This is especially true of a system where all of the underlying data required for display to the user resides in a centralized data store and multiple services need access to read and modify the data. Also, if the system is configured such that the GUI data model for the user interface display data is designed such that only one service at a time can access the data model, then immediate access is even more inhibited. Ideally, when the user accesses a page of data, such as a web page, on the GUI, immediate access and generation of that page using the data stored in the data model is expected. However, if other services are using the data model, the GUI may need to wait until those services have finished accessing the data model before the GUI can access the data model. This sometimes results in delays in retrieving data that make a GUI seem slow and result in a poor user experience. Thus, a need exists for a scheme that provides a solution that balances the need for a responsive GUI with the need to report accurate data.

SUMMARY

This summary is provided to introduce a selection of concepts in a simplified form as a prelude to the more detailed description that is presented later. The summary is not intended to identify key or essential features of the invention, nor is it intended to delineate the scope of the claimed subject matter.

One aspect of the invention includes a method to preferentially wait for a primary source of information to become available in a system where there is also a secondary source of the information. The wait for the primary source of information being necessitated by serial access restrictions on the primary source of information. The method includes receiving a request for information that is to be displayed and determining if the information from the primary source is available. If the primary source is not available, testing a dynamic threshold value to detect if a wait time for access availability of the primary source is exceeded. If the wait time for access availability of the primary source is exceeded, then acquiring the information from the secondary source instead of the primary source. The dynamic threshold includes an elapsed time since receipt of the request as measured from a receipt time of a prior request. The dynamic threshold further comprises a coefficient affecting the total wait time for primary source availability between requests.

Additional features and advantages of the invention will be made apparent from the following detailed description of illustrative embodiments which proceeds with reference to the accompanying figures.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention. In the drawings, like numbers represent similar elements.

DETAILED DISCUSSION OF THE EMBODIMENTS

In the following description of various illustrative embodiments, reference is made to the accompanying drawings, which form a part thereof, and in which is shown, by way of illustration, various embodiments in the invention may be practiced. It is to be understood that other embodiments may be utilized and structural and functional modification may be made without departing from the scope of the present invention.

Figure 1:
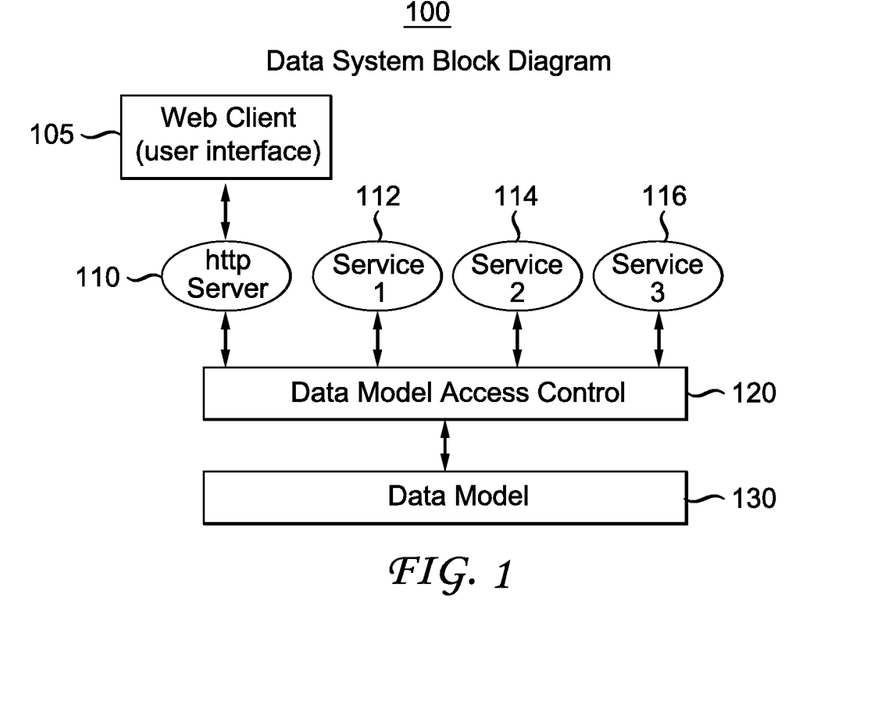
FIG. 1 illustrates a block diagram of a system in which the need for the current invention may reside.

In one example embodiment of a system which shows need for the current invention, a web interface serves as the GUI for a DSL modem. Most of the data provided by the GUI is dynamic; representing either modem configuration or status. All of this data resides in a centralized data store and multiple services need access to read and modify the data. However, the data model is designed such that only one service at a time can access the data model. FIG. 1 illustrates a block diagram of such a system architecture 100.

In FIG. 1, a web client 105 accesses a http server 110 in order ultimately access a data model 130 whose information is useful in building a web page that is useful to the web client 105. Requests for access from the http server 110 are placed to a data model access control block 120. However, other services such as Service 1, 2, and 3, represented by items 112, 114, and 116 respectively, also may be requesting access to the data model via the data model access control block 120. The data model 130 is designed such that each service accessing the data model acquires exclusive access to the data model and holds it until its requested transaction is complete. This can cause the GUI of the web client 105 to be unresponsive when other services 112, 114, or 116 hold exclusive access to the data model 130.

Figure 2:
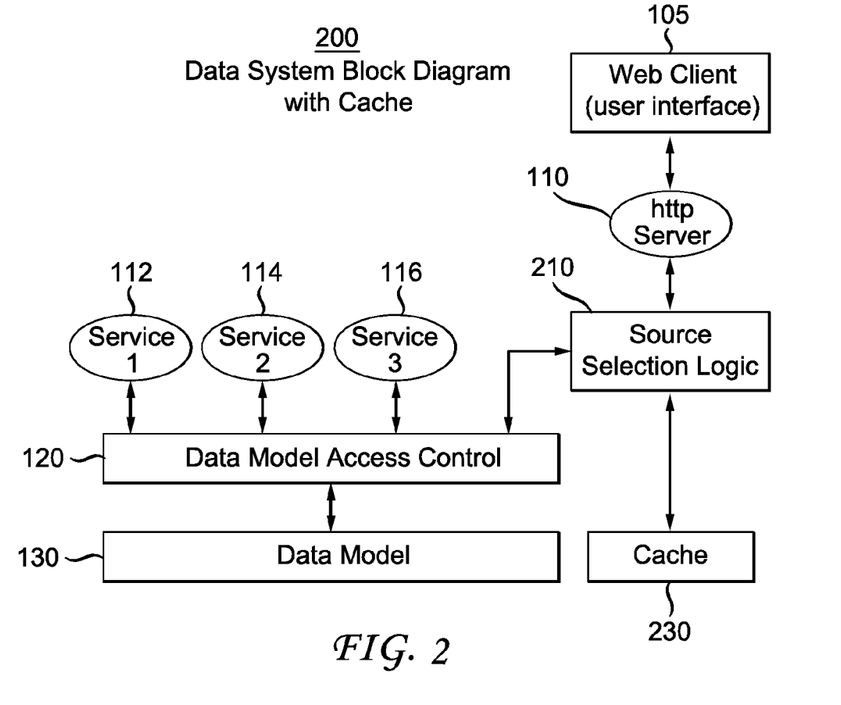
FIG. 2 illustrates a system depicting an example embodiment of the current invention.

FIG. 2 shows a block diagram of architecture 200 according to the current invention. In addition to the data model 130, the http server maintains a second data source 230, which is a cache of previously retrieved pages. At startup, a cached version of each page is created and stored in the cache 230. Thereafter, any time a page is generated from data in the data model 130, the cache 230 is updated with the new page version. When data is requested by the user via the user interface (UI) of the web client 105, source selection logic 210 determines whether data is ultimately generated from the data model 130 or whether a cached version is sent to the user from the cache 230.

Thus, the architecture 200 of FIG. 2 introduces a cache 230 of information that can be used by the web client 105 when the data model 130 is unavailable. However, such use can result in the web client 105 user being presented with stale data because cache 230 data can be immediately substituted for fresh data available only via the data model 130. Although this is responsive to the user's UI request for a web page, the architecture itself does not address the staleness of the data acquired by the potential immediate substitution of data model information when the data model itself is unavailable.

In one aspect of the invention, the present invention improves the user experience by balancing UI responsiveness and data accuracy in a system where access to the data source may become unavailable to the UI for periods of time due to exclusive access obtained by other resources. As a result, in the current invention, the selection logic for determining whether to use cache 230 data or the data model data 130 is dependent on not only the availability of the data model 130 but also on the elapsed time between requests for data model 130 information.

Figure 3:
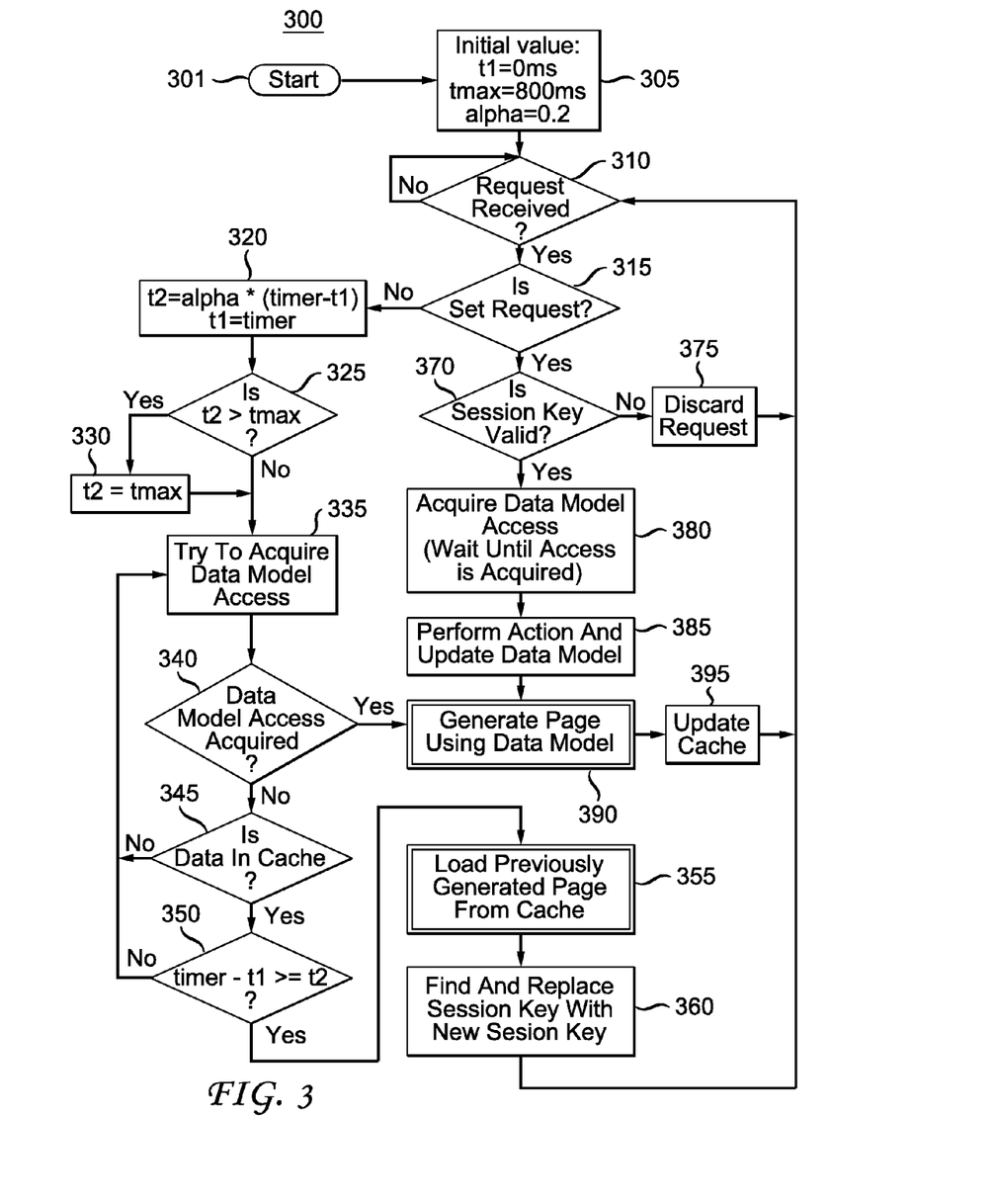
FIG. 3 illustrates an example flow diagram of the current invention.

FIG. 3 shows a flow chart of the logic used to select whether cached data should be used for any particular request. In FIG. 3, UI data for presentation to a user from a web client 105 request is generated based on access to the data model 130 whenever possible. When access to the data model 130 is not immediately available, the current invention waits for a period of time to try to access data model 130 information. Complicating this effort is that all requests presented to the data model access control block 120 are processed serially and a single request from a web client 105 user may result in multiple page requests to the http server 110.

The flow diagram of FIG. 3 waits a period of time trying to access the data model 130. When the time period expires, cached data from the cache 230 is used. However, the time it waits for any particular request is dynamic, based on the time elapsed between requests. The present invention provides a good tradeoff between waiting for the most accurate data from the data model 130 and using cached data from cache 230 when needed to improve user experience. It also gracefully handles bursts of requests without excessive waiting. This is important as some UI requests by the user may result in multiple page requests to the server.

The flow diagram of FIG. 3 can represent an exemplary embodiment of the invention where a device, such as a modem or gateway has a data access control feature 120 to access a data model 130 needed to supply data for a web client 105. As in FIG. 2, an http server attempts to access the data model 130 via source selection logic 230. The process 300 starts at step 301 and initializes algorithm parameters at step 305. Once a request is received at step 310, it is determined if the request is a set request at step 315. A set request is a request to set a parameter within the modem or gateway. If the request is not a set request, then the request is essentially a read request and the process 300 proceeds to step 320. T2 is a parameter of the algorithm that represents the time that the process 300 waits before accessing the cache 230 if the data model 130 is not available. At step 320, t2 is defined as t2=alpha×(timer−t1). The timer is a current time, such as the time of day or other relevant current time, and t1 is the time that the last (previous) request was received. The alpha value is a coefficient that controls how aggressively the system should wait when handling subsequent requests when bursts of requests are received.

At step 325, t2 is tested. If t2 is less than or equal to tmax, then the process 300 proceeds to step 335 where the modem or gateway attempts to access the data model. Tmax is a selectable parameter that defines the maximum time the process 300 would wait to access the data model 130 for any particular request. If at step 325, the values of t2 is greater than tmax, then t2 is set to the value of tmax at step 330 before proceeding to step 335. Step 330 is inserted to assist the determination of step 350 described below. At step 335, access to the data model 130 is attempted. The process 300 then progresses to step 340.

At step 340, it is determined whether access to the data model was successful and the data model information is acquired. If the data model is not able to be accessed, because some other service is using the data model, then it is determined if the data sought is in cache 230 at step 345. If the data is not in cache 230, the process returns to step 335 where the data model access is once again attempted. In the condition where data is not cached, then the process must eventually gain access to data model via step 340 and step 390.

Assuming that process 300 gains access to the data model information, via step 340, then step 390 is executed where the web page information requested by the web client device 105 is provided. In the instance where security information, such as a session key is used in the configuration of FIG. 2, then the data model information and the present session key are used to generate the web page information requested by the client.

In one embodiment, a session key is included in the JavaScript of each page delivered to the user of the web client 105. The session key is a randomly generated unique value that changes each time a page is requested. If a user requests a set action (for example, modifying the modem's configuration) the session key must be sent with the request. If the session key sent with the set request doesn't match the last session key generated by the modem, the set request is rejected. This scheme prevents certain kinds of attacks like a "replay attack". An example would be if a user sent a command to disable the wireless radio on her modem. An attacker could intercept this message and save it. Then days later after she turned the wireless radio on her modem back on, the attacker could send the saved message to the modem and turn her radio off. Using session keys prevents this kind of attack because the session key contained in the intercepted request would no longer be valid and would be rejected, rendering the attackers attempt useless.

From step 390, the process 300 updates the cache using the latest data model information at step 395. The process then proceeds from step 395 to step 310 to service a new request from the web server 105.

Returning to step 340, if the process determines that data model access is not successful, then the process proceeds to step 345. If at step 345, if the data is in the cache 230, then it is determined, at step 350, if the elapsed time (timer−t1) is greater than or equal to t2, which is the time the process waits before accessing the data in the cache. If, at step 350, the elapsed time (timer−t1) is not greater than or equal to t2, then the process waits a further amount of time before accessing the cache 230 by moving back to step 335. Once the test at step 350 indicates that the elapsed time is greater than the time the process is willing to wait before accessing the cache 230, then the process 300 proceeds to step 355. At step 355, the process loads information from the cache 230 instead of trying to access the data model. In one embodiment, the data in the cache 230 represents web page data and that data is provided to the web server 105 via the http server 110 and the source selection logic, such as that of FIG. 3.

If security measures such as session keys are implemented in the system of FIG. 2, then the flow diagram of FIG. 3 can move from step 355 to step 360. This step includes the process of finding and replacing the session key information of the cache 230 and updating it by replacing the session key with the new session key. From step 360, the process 300 proceeds from step 360 to step 310 to await another request for access. Instead of simply delivering cached pages to the user in unmodified form, the cache is parsed in the cached pages by finding the JavaScript containing the old session key, replacing the session key in the JavaScript with a newly generated session key, and then delivering the page to the user. This allows use of the session keys to protect transactions. This normally would not be possible with cached pages because the cached pages would contain old and invalid session keys.

Returning to step 310, if a request is received, the process proceeds to step 315. If it is determined that the request is a configuration or data set request, such as occurs in a write operation, then the process proceeds to step 370. A write request requires a valid session key to continue. If the session key is found invalid at step 370, the process proceeds to step 375 where the request is discarded and the process is moved back to step 310. If however, the session key is valid at step 370, then the process proceeds to step 380 where the process must wait for a successful access to the data model. Upon a successful access, the data model is updated at step 385. The process then proceeds to step 390 where the session key and the new data model information is used to generate updated web page information so that the cache 230 can be updated at step 395. After updating the cache 230, the process proceeds to step 310 to await the next read or write request.

In one example implementation, fixed values of tmax=800 ms and alpha=0.2 are used. Tmax defines the maximum time used to wait to access the data model for any particular request and the alpha value is a coefficient that controls how aggressively the wait period ends when handling subsequent requests when bursts of requests are received. These two values can be altered to adjust the tradeoff between UI responsiveness and providing the most accurate data. With the values tmax of 800 ms and alpha of 0.2 and, ignoring any processing time, the total time spent waiting on access to the data model to process a burst of page requests of infinite size will be no more than 1 second. The chosen alpha value should be between 0 and 1 to ensure the total time spent waiting on access to the data model is bounded for burst transactions of any size.

FIG. 3 describes a method of prioritizing the access of fresh information from a limited access data source, such as the data model 130, while balancing the need for responsiveness of a user interface, such as the web client 105 user interface. The priority is for fresh information from the primary data source. The alternative is the secondary data source, such as cache 130, if the primary data source is unavailable. Generally, the cache contains data that is less fresh or not as up to date as the data in the data model of the primary source. Fresh data is data that has been more recently updated, renewed, edited, or saved as compared to older data. In one embodiment, fresh data has a more recent time stamp as compared to older data that has a less recent time stamp than the fresh data. The fresh data may also be referred to as the first data and the older data may be referred to as the second data. The first data is preferred over the second data because the first data is more recent in time and originates from the data model memory as compared to the second data which may be older in time than the first data. The second data may be a copy or a version of the first data and may be the same as the first data or an older copy or version of the first data. In either event, the older data of the secondary source may be used as a substitute for the fresh data of the data model when the primary source is unavailable. The method of FIG. 3 includes requesting display information, such as web page display information for a user interface via web client 105, which is available from a primary data source of limited availability, such as the data model 130. The method sets up a timer to count the elapsed time between requests. The method uses a value of tmax, a maximum time to wait until the primary data source is available for access, and value of alpha, a coefficient to control how long a wait is tolerated for availability of the primary data source when handling subsequent requests. The utility of the value alpha can be appreciated when multiple requests are received, such as when multiple web pages are requested by the web client 105. The value of alpha regulates how much the wait time is decreased for each subsequent request in a burst transaction. In all cases the wait time decay will be exponential, but alpha controls the rate of decay.

A burst of received requests from the web client 105 can occur if multiple web pages are requested. In a burst, multiple requests are set up and are present in a queue underlying step 310 of FIG. 2. When the process 300 executes a first request in a burst of requests, then the elapsed time between requests, i.e. the value of (timer−t1), is used to set the value of t2 per the equation of step 320 as t2=alpha×(timer−t1). The next request is immediately available in step 310 of FIG. 3. The elapsed time between requests, i.e. the value of (timer−t1), is small since the request being processed is in a burst of requests and the request being processed is immediately available at step 310. Thus, at the second and subsequent requests in a burst of requests, the value of t2 established by step 320, i.e t2=alpha×(timer−t1), is smaller than in the previous request processing. Accordingly, the value of alpha selected can reduce the threshold wait time. This effect is seen in FIG. 7.

Figure 7:
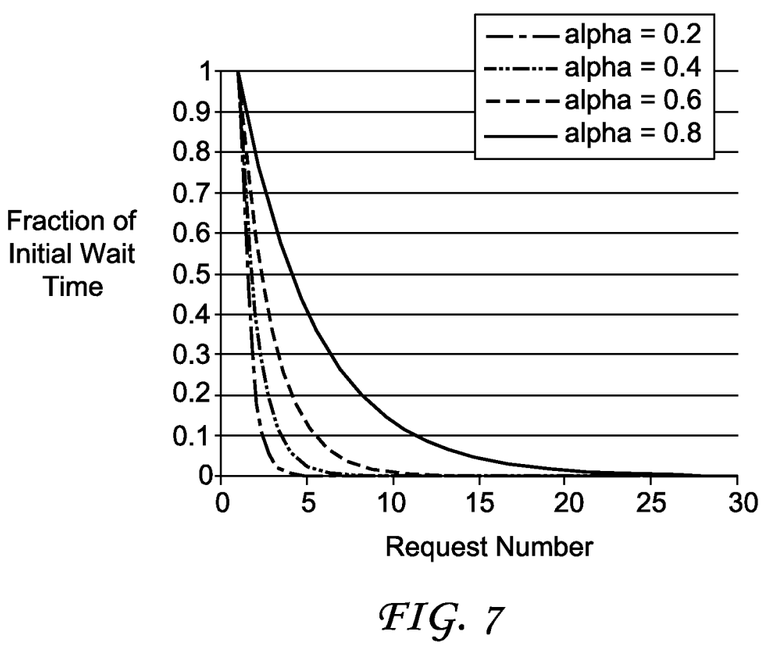
FIG. 7 is a graph that illustrates the effect of a coefficient alpha on wait time as subsequent requests are processed in a burst of requests.
Figure 8:
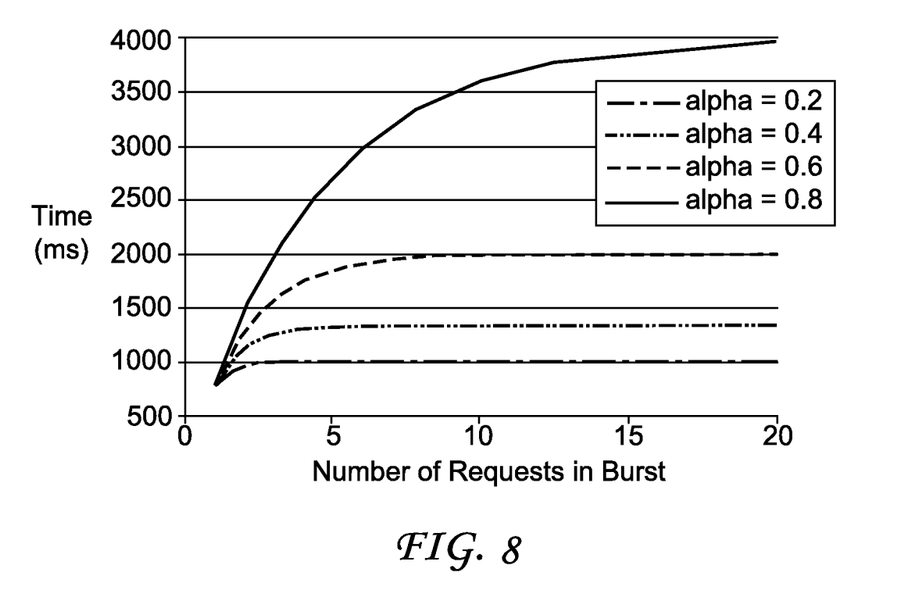
FIG. 8 is a graph that illustrates the effect of the coefficient alpha on wait time as the number of requests in a single burst is increased.

FIG. 7 is a graph that illustrates the effect of the coefficient alpha on wait time as subsequent requests are processed in a one burst of requests. FIG. 7 shows how wait time decreases with subsequent requests when the invention processes one burst of requests for different values of alpha. Assuming the data model 130 is unavailable, larger values of alpha used in step 320 of FIG. 2 produce larger wait times until the cache 230 is used to fulfill requests for information. FIG. 8 shows the total time required to process a burst of request for different values of alpha assuming an initial wait time of 800 ms for the first request. For all values of alpha between 0 and 1, the total time required to process a burst request of any size will converge to a fixed maximum value. For tmax=800 and alpha=0.2 as described in the example embodiment, the maximum time required to process a burst transaction will be 1000 ms as shown in FIG. 8.

Understanding the effect of alpha, the method of FIG. 3 can be summarized as follows. Having set up a timer, the method determines if the primary data source having fresh data is available to successfully access to provide the requested display information. Assuming that the fresh data of the primary source is not available for access, the method determines if an older set of data in the secondary source of the requested display information is available. An example secondary source of display information is cache 230. If the secondary source of older data for display exists, then an elapsed time since the last request is used to determine if the wait for the fresh data of the primary data source has exceeded a wait time threshold. In one embodiment, the wait time threshold is determined via an algorithm having the alpha coefficient such that the wait time threshold t2 is sensitive to the alpha value. In one aspect of the invention, the threshold to wait for the availability of the primary source of fresh data is dynamic and changes. Factors affecting the value of the threshold are the elapsed time since the last request and the alpha value. Larger values of alpha produce an extended wait time. If the value of alpha is small, then the wait time is shortened relative to the larger values of alpha.

If the elapsed time since the last request does not exceed the threshold, the method tries once again to access the fresh data of the primary data source while the timer continues running. The method continues to test if the fresh data of the primary data source is available and waits until either the primary data source is available or if the threshold for waiting is reached. If the primary data source becomes available, then the primary data source is read, the older data in the secondary data source is updated to reflect the fresh primary source data, and the method returns to await a next request. If however, the fresh primary data source is not available and the timer reaches the dynamic threshold, then the requested display data is loaded from the older data of the secondary source. The method can then return to detect a next request and repeat as needed.

If the request for display information is such that the request represents a write operation to the data model of the primary data source, then access to the older data of the secondary data source is not needed. In this instance, the older data of the secondary source cannot suffice as a substitute for access to the data model of the primary data source.

In the instance where security measures are present in a system having the inventive method, such as the need for session key use, then the process of servicing the request for display information using the older data of the secondary source of display information must include an update to the current session key. In this instance, if the older data of the secondary source is used as the requested display information only after the current session key is added to the retrieved secondary source data.

Figure 3A:
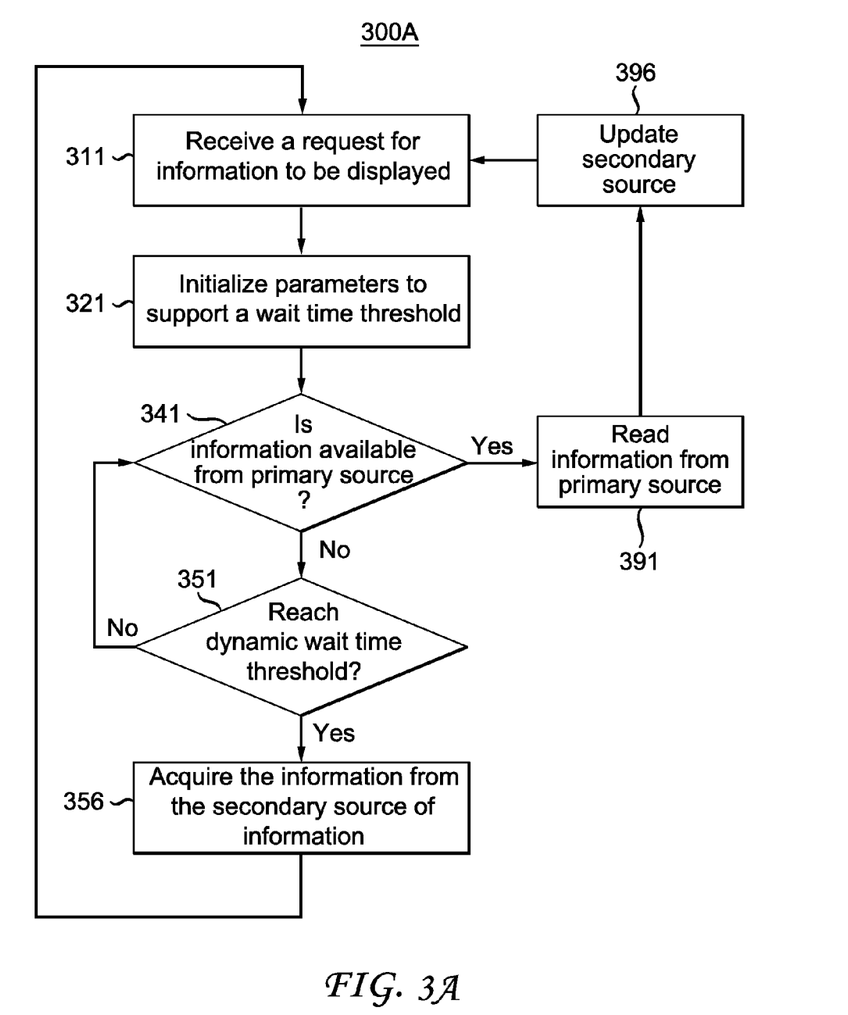
FIG. 3A depicts another example flow diagram of the current invention.

FIG. 3A depicts a select but functional and core part of the flow diagram of FIG. 3. The process 300A starts at step 311 with the receipt of a request to display information, such as the request for a web page received from the web client 105 via the http server of FIG. 2. Next, parameters to support a wait time threshold are initialized for the request at step 321. Such parameters include a count of the present time and the time since the last received request. Another relevant parameter includes the maximum wait time period (tmax) for a successful access of the requested display information from the primary source. An example primary source is data store 130. Another relevant parameter includes alpha which is the coefficient that regulates the threshold time to be compared against the elapsed time. At step 341, access to the primary data source is tested. If the primary data source is available, then the requested information is read from the primary source at step 391. Then the secondary source data is updated at step 396 with the recently read primary source information. The process 300A then returns to step 311 to receive the next request. In one aspect of the invention, the coefficient alpha is used to reduce the wait time from one request to another when a burst of multiple requests for information are received.

If at step 341, the primary source of information is not available, then at step 351, the dynamic wait time is tested to see if it has reached a threshold. The threshold for this step is expressed in step 350 of FIG. 2 as (timer−t1)> or =t2. Where (timer−t1) represents elapsed time and t2 is expressed as in step 320 of FIG. 2 as t2=alpha×(timer−t1). If the dynamic threshold of t2 is not reached, then process 300A proceeds from step 351 to step 341. However, if the threshold is reached, then the dynamic threshold is equal or is exceeded and the process proceeds to step 356. To complete the request, the secondary source of the requested information is used at step 356. The process then returns to step 311 until a next request for information is received.

Figure 4:
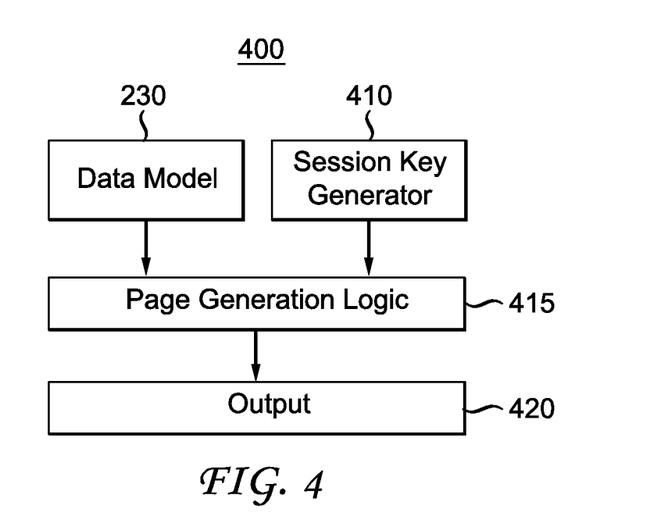
FIG. 4 illustrates an example block diagram of a system generating page data using access to the data model and a session key using aspects of the invention.

The block diagram 400 of FIG. 4 further represents the hardware/software functions used to execute step 390 of FIG. 3. Information from the data model 230 and a session key generator 410 combine within the page generation logic 415 to produce an output 420 needed by the web client 105. The session key generator 410 can be a processing element within the modem or gateway that generates a session key using standard authentication and authorization techniques as are well known by those of skill in the art. The page generation logic can be either a hardware, or a hardware and software combination element that operates within the modem or gateway having the data model of FIG. 2.

Figure 5:
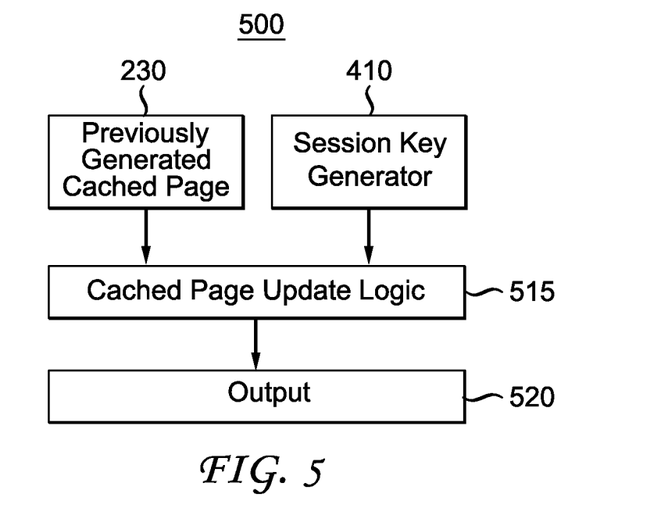
FIG. 5 illustrates an example block diagram of a system generating page data using a cached copy of the data model and a session key using aspects of the invention.

The block diagram 500 of FIG. 5 further represents the hardware/software functions used to execute step 355 of FIG. 3. Information from the previously cached page 230 and a session key generator 410 combine within the cached page update logic 515 to produce an output 520 needed to update the cache 230. The session key generator 410 can be a processing element within the modem or gateway that generates a session key using standard authentication and authorization techniques as are well known by those of skill in the art. The cached page update logic 515 can be the same or different from that of item 415 of FIG. 4.

Figure 6:
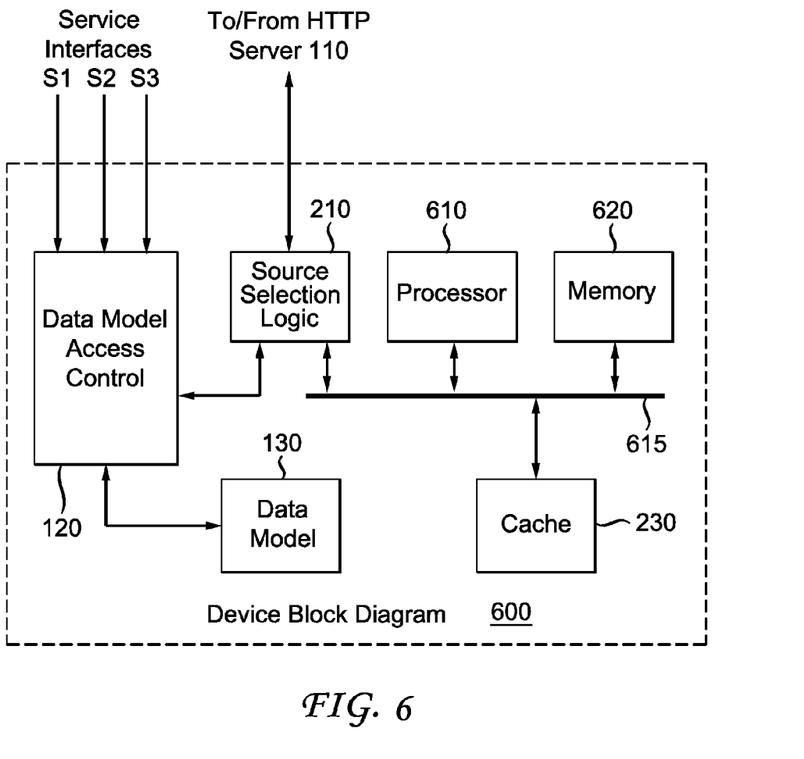
FIG. 6 illustrates an example block diagram of a device which can embody the present invention.

FIG. 6 depicts a block diagram of an example device 600, such as a modem or gateway, which includes a structure suitable for the implementation of the present invention. The device 600 includes a processor 610 suitable for the execution of instructions, such as firmware, microcode, or software that may be resident in the processor 610 or in memory 620. The processor 610 and memory 620 act in cooperation to assist in achieving the functionality of the present invention, such as that represented in FIG. 3. In one embodiment, the device 600 supports an internal bus 615 that accommodates communication between various components internal to the device. For example, the cache 230 may be implemented as an element on the internal bus 615 or may optionally be implemented as an element directly connected to the source selection logic 210. Thus, the cache can be either single ported or dual ported for ease of access by either the source selection logic 210 and/or the processor 610 via bus 615. The cache 230 generally contains a copy of the data in the data model 130 memory, which is the primary source of requested data for display, but the data of the cache 230, which is the secondary source of requested data for display, can be older or not as fresh as the data model data 130 memory data of the primary source.

External interfaces to the device 600 include interfaces from the external services S1, S2, and S3 corresponding to items 112, 114, and 116 respectively of FIG. 2. As described before, these services compete for access to the fresh data of the data model 130 via the data model access control 120. In one embodiment, the data model 130 is memory accessible to the data model access control 120 block. The http server 110 of FIG. 2 presents an external interface to the device 600 into the source selection logic 210. It is the source selection logic that provides the interface between the http server 110 and either the data model access control 120 or the cache 230 to acquire information needed by the web client 105. The source selection logic 210 can be implemented as hardware digital logic or may be an implementation that employs instruction execution via firmware or software and processor 610. Memory 620 can support the firmware or software instruction needed for processor execution of the functionality of the source selection logic.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms. For example, implementation can be accomplished via a hardware apparatus, hardware and software apparatus. An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device.

Additionally, the methods may be implemented by instructions being performed by a processor, and such instructions may be stored on a processor or computer-readable media such as, for example, an integrated circuit, a software carrier or other storage device such as, for example, a hard disk, a compact diskette ("CD" or "DVD"), a random access memory ("RAM"), a read-only memory ("ROM") or any other magnetic, optical, or solid state media. The instructions may form an application program tangibly embodied on a computer-readable medium such as any of the media listed above or known to those of skill in the art.

The invention claimed is:

1. In an electronic system having first data from a primary source, said first data being generated based on a data model in response to a request, and second data from a secondary source, said second data being first data generated in response to a prior request, a method of waiting for the primary source to become available comprising:
receiving a request for the first data from the primary source, the requested data to be displayed to a user interface;
determining if the first data from the primary source is available;
when the first data from primary source is not available, testing a dynamic threshold value to detect if a wait time for access to the first data from the primary source is exceeded;
upon determining said primary source is available and the wait time for access availability of the primary source is not exceeded:
generating first data based on a data model; and
providing the first data in response to the request; and
upon determining said primary source is not available and the wait time for access availability of the primary source is exceeded:
providing the second data from the secondary source instead of the first data from the primary source in response to the request;
wherein the dynamic threshold includes an elapsed time since receipt of the request as measured from a receipt time of a prior request.

2. The method of claim 1, wherein the primary source is memory containing an up-to-date data model and the secondary source is a cache containing a second version of the data model.

3. The method of claim 1, wherein the primary source has serial access restrictions.

4. The method of claim 1, wherein the dynamic threshold further comprises a coefficient affecting the total wait time for primary source availability between requests.

5. The method of claim 1, further comprising:
finding and replacing an old session key with a new session key after acquiring the information from the secondary source.

6. The method of claim 1, wherein the dynamic threshold has a maximum limit.

7. The method of claim 1, wherein upon processing a burst of requests for information, a coefficient is used to reduce the wait time for access availability.

8. An apparatus that waits for first data from a primary source to become available before accessing second data from a secondary source in response to a user interface request, said first data being generated based on a data model in response to a request and said second data being first data generated in response to a prior request, the apparatus comprising:
a memory comprising the primary source of the first data;
a cache comprising the secondary source of the second data, wherein the first data from the primary source is preferred over the second data of the secondary source when accessed via the user interface;
selection logic for determining whether to use the first data from the primary source or the second data from the secondary source, wherein the selection logic acts to access the primary source if the primary source is available and acts to wait to access the primary source if the primary source is unavailable, and wherein the selection logic acts to access the secondary source if a wait time for access to the primary source is exceeded.

9. The apparatus of claim 8, wherein the selection logic utilizes a processor to test a dynamic threshold value to detect if a wait time for access availability of the primary source is exceeded.

10. The apparatus of claim 9, wherein the dynamic threshold includes an elapsed time since receipt of the request as measured from a receipt time of a prior request.

11. The apparatus of claim 8, wherein the apparatus is one of a modem or gateway.

12. The apparatus of claim 8, wherein the memory further comprises a data model.

13. The apparatus of claim 12, wherein the data model is serially accessed via a data model access control.

14. The apparatus of claim 13, wherein the data model access control provides serial control from multiple sources of requests for the first data.

15. The apparatus of claim 8, wherein the cache stores a second version of the data model.

16. The apparatus of claim 8, further comprising an http server having the user interface used to generate a request for the first data.

17. A computer-readable medium having computer instructions, which when executed by a processor in an electronic system having first data from a primary source and second data from a secondary source perform a method of waiting for the primary source to become available, said first data being generated based on a data model in response to a request and said second data being first data generated in response to a prior request, the executed instructions comprising:

receiving a request for the first data from the primary source, the requested data to be displayed to a user interface;

determining if the first data from the primary source is available;

when the first data from primary source is not available, testing a dynamic threshold value to detect if a wait time for access to the first data from the primary source is exceeded;

upon determining said primary source is available and the wait time for access availability of the primary source is not exceeded:

generating first data based on a data model; and providing the first data in response to the request; and upon determining said primary source is not available and the wait time for access availability of the primary source is exceeded;

providing the second data from the secondary source instead of the first data from the primary source in response to the request;

wherein the dynamic threshold includes an elapsed time since receipt of the request as measured from a receipt time of a prior request.

18. The computer-readable medium of claim 17, wherein the primary source is memory containing an up-to-date data model and the secondary source is a cache containing a second version of the data model.

19. The computer-readable medium of claim 17, wherein the dynamic threshold further comprises a coefficient affecting the total wait time for primary source availability between requests.

20. The computer-readable medium of claim 17, wherein upon processing a burst of requests for information, a coefficient is used to reduce the wait time for access availability.

* * * * *